United States Patent
Cha et al.

(10) Patent No.: US 10,484,963 B2
(45) Date of Patent: Nov. 19, 2019

(54) METHOD AND APPARATUS FOR TRANSMITTING AND RECEIVING PAGING MESSAGE IN MOBILE COMMUNICATION SYSTEM

(71) Applicant: Samsung Electronics Co., Ltd, Suwon-si (KR)

(72) Inventors: Hwajin Cha, Seongnam-si (KR); Sung Hwan Won, Seoul (KR); Jinuk Lee, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/772,004

(22) PCT Filed: Oct. 28, 2016

(86) PCT No.: PCT/KR2016/012248
§ 371 (c)(1),
(2) Date: Apr. 27, 2018

(87) PCT Pub. No.: WO2017/074100
PCT Pub. Date: May 4, 2017

(65) Prior Publication Data
US 2018/0317201 A1 Nov. 1, 2018

(30) Foreign Application Priority Data
Oct. 30, 2015 (KR) .................. 10-2015-0152212

(51) Int. Cl.
*H04W 68/02* (2009.01)
*H04W 72/12* (2009.01)
(Continued)

(52) U.S. Cl.
CPC ....... *H04W 68/02* (2013.01); *H04W 72/1242* (2013.01); *H04L 47/30* (2013.01); *H04L 49/9089* (2013.01); *H04W 28/0289* (2013.01)

(58) Field of Classification Search
CPC . H04W 72/10; H04W 68/00; H04W 28/0268; H04W 28/26; H04W 68/02;
(Continued)

(56) References Cited

U.S. PATENT DOCUMENTS

| 5,533,094 A | 7/1996 | Sanmugam |
| 9,344,995 B2 * | 5/2016 | Lim ...................... H04W 68/12 |

(Continued)

FOREIGN PATENT DOCUMENTS

| KR | 10-2000-0059489 A | 10/2000 |
| KR | 10-0296511 B1 | 10/2001 |

(Continued)

OTHER PUBLICATIONS

International Search Report dated Jan. 23, 2017 in connection with International Patent Application No. PCT/KR2016/012248.
(Continued)

*Primary Examiner* — Diane D Mizrahi (57) ABSTRACT

The present invention relates to a method and an apparatus for transmitting and receiving a paging message in a mobile communication system and, more particularly, to a method and an apparatus for determining a priority between paging messages at a wireless access point and paging a terminal. A method for paging a wireless access point in a mobile communication system according to an embodiment of the present invention comprises the steps of: receiving a plurality of paging messages from a core network; determining a priority between the plurality of paging messages; and transmitting the paging message to a terminal on the basis of the determined priority, wherein information on a number of (Continued)

paging attempts included in the paging messages is used for determining the priorities. The present disclosure relates to a 5G or pre-5G communication system that will be provided to support higher data rates than a post-4G communication system such as LTE.

14 Claims, 4 Drawing Sheets

(51) Int. Cl.
  *H04L 12/835* (2013.01)
  *H04L 12/861* (2013.01)
  *H04W 28/02* (2009.01)
(58) Field of Classification Search
  CPC . H04W 28/02; H04W 72/1242; H04W 72/02; H04W 72/0413; H04W 72/04; H04W 72/042; H04W 72/0446; H04W 72/12; H04L 47/30; H04L 49/9089; H04L 47/821
  See application file for complete search history.

(56) References Cited

U.S. PATENT DOCUMENTS

| | | | |
|---|---|---|---|
| 2007/0077946 A1 | 4/2007 | Benco et al. | |
| 2008/0146253 A1 | 6/2008 | Wentink | |
| 2010/0197294 A1* | 8/2010 | Fox | H04W 48/02 455/422.1 |
| 2013/0310085 A1 | 11/2013 | Vargantwar et al. | |
| 2014/0146678 A1 | 5/2014 | Merlin et al. | |
| 2014/0162705 A1 | 6/2014 | De Wit et al. | |
| 2015/0163827 A1* | 6/2015 | Ekici | H04W 68/02 370/338 |
| 2015/0230199 A1 | 8/2015 | Jeong et al. | |
| 2016/0157208 A1* | 6/2016 | Liang | H04W 72/005 455/458 |
| 2016/0262068 A1 | 9/2016 | Won et al. | |
| 2017/0230933 A1* | 8/2017 | Radulescu | H04W 16/14 |

FOREIGN PATENT DOCUMENTS

| | | |
|---|---|---|
| KR | 10-2014-0035785 A | 3/2014 |
| KR | 10-2015-0113136 A | 10/2015 |

OTHER PUBLICATIONS

Written Opinion of the International Searching Authority dated Jan. 23, 2017 in connection with International Patent Application No. PCT/KR2016/012248.

Communication from a foreign patent office in a counterpart foreign application, European Patent Office, "Supplementary European Search Report," Application No. EP 16860283.7, dated Aug. 30, 2018, 11 pages.

\* cited by examiner

METHOD AND APPARATUS FOR TRANSMITTING AND RECEIVING PAGING MESSAGE IN MOBILE COMMUNICATION SYSTEM

CROSS-REFERENCE TO RELATED APPLICATIONS AND CLAIM OF PRIORITY

This application is a 371 of International Application No. PCT/KR2016/012248 filed on Oct. 28, 2016, which claims priority to Korean Patent Application No. 10-2015-0152212 filed on Oct. 30, 2015, the disclosures of which are incorporated herein by reference in their entireties.

TECHNICAL FIELD

The present invention relates to a method and apparatus for transmitting and receiving paging messages in a mobile communication system and, in particular, to a method and apparatus for paging a terminal according to the priorities of paging messages that are determined by a wireless access point.

BACKGROUND

Mobile communication systems were developed to provide subscribers with voice communication services on the move. Recently, mobile communication systems have evolved to the level of supporting high speed data communication services beyond the early voice-oriented services. However, resource shortages and growing user demand for higher speed services are spurring evolution towards more advanced mobile communication systems.

As one of the next-generation mobile communication standards to meet such requirements, long term evolution (LTE) is underway in the $3^{rd}$ generation partnership project (3GPP). LTE is a technology designed to provide high-speed packet-based communication of up to 100 Mbps.

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post LTE system.

Implementation of the 5G communication system in millimeter wave (mmWave) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna.

Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation.

Furthermore, the ongoing research includes the use of hybrid frequency shift keying (FSK) and quadrature amplitude modulation (QAM) {FQAM} and sliding window superposition coding (SWSC) as advanced coding modulation (ACM), filter bank multicarrier (FBMC), non-orthogonal multiple access (NOMA), and sparse code multiple access (SCMA).

Considering that a terminal does not always perform data and voice communication, it is useful to introduce an idle mode to the terminal, wireless access point, and core network. That is, during no data transmission or communication, the terminal may enter the idle mode. The wireless access point and core network may also manage the terminal operating in the idle mode as an idle mode terminal. The detailed location of a terminal in the idle mode may not be exposed to wireless access points and RAN control entities in the core network. Accordingly, when data to be delivered to the terminal arrives, the core network has to page the terminal.

If the core network detects the presence of data to be delivered to a terminal, it may select an appropriate wireless access point and send a paging message including information for paging the terminal to the selected wireless access point. Then, the wireless access point may send the received paging message to the corresponding terminal.

However, in line with the advance of mobile communication technologies, the steady growth of the number of terminals and diversification of push notification services increases the number of terminal-paging events. In the case where the number of paging events abruptly increases in a core network, too many paging messages are sent to the wireless access point, resulting in saturation of the paging buffer of the wireless access point. This causes paging message loss and, as a consequence, the successful paging rate remains at a low level. There is therefore a need of a method for utilizing the paging resources efficiently in the paging resource-constrained core network and wireless access point, especially when the paging resources are congested.

SUMMARY

The present invention has been conceived to solve the above problems and aims to provide a method for determining priorities for paging messages based on the information included in the paging messages when a wireless access point sends at least one received paging message to a terminal. Also, the present invention aims to provide a method for a wireless access point to determine a paging message transmission area based on the information included in the paging message.

In accordance with another aspect of the present invention, a paging method of a wireless access point in a mobile communication system includes receiving a plurality of paging message from a core network, determining priorities of the paging messages, and transmitting a paging message to a terminal based on the determined priorities, wherein the paging messages include information on a number of paging attempts for use in determining the priorities.

In accordance with an aspect of the present invention, a wireless access point for paging in a mobile communication system includes a transceiver configured to transmit and receive signals and a controller configured to control to receive a plurality of paging messages from a core network, determine priorities of the paging messages, and transmit a paging message to a terminal based on the determined priorities, wherein the paging messages include information on a number of paging attempts for use in determining the priorities.

The present invention is advantageous in terms of protecting against paging message loss and utilizing paging resources efficiently in such a way that a wireless access point assigns priorities to multiple paging messages and determines a paging area.

DETAILED DESCRIPTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Although the description is directed to the Advanced E-UTRA (or LTE-A) system supporting carrier aggregation, it will be understood by those skilled in the art that the present invention can be applied even to other communication systems having a similar technical background and channel format, with a slight modification, without departing from the spirit and scope of the present invention. For example, the present invention is applicable to a multicarrier HSPA supporting carrier aggregation.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time or may be performed in reverse order according to their functions.

According to various embodiments of the present disclosure, the term "module", means, but is not limited to, a software or hardware component, such as a field programmable gate array (FPGA) or application specific integrated circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card. Although the description is mainly directed to long term evolution (LTE) and evolved packet core (EPC) for radio access network (RAN) and core network (CN) that are standardized by the $3^{rd}$ Generation Partnership Project (3GPP), it will be understood by those skilled in the art that the present invention can be applied even to other communication/computing systems having a similar technical background and channel format, with a slight modification, without departing from the spirit and scope of the present invention.

Figure 1:
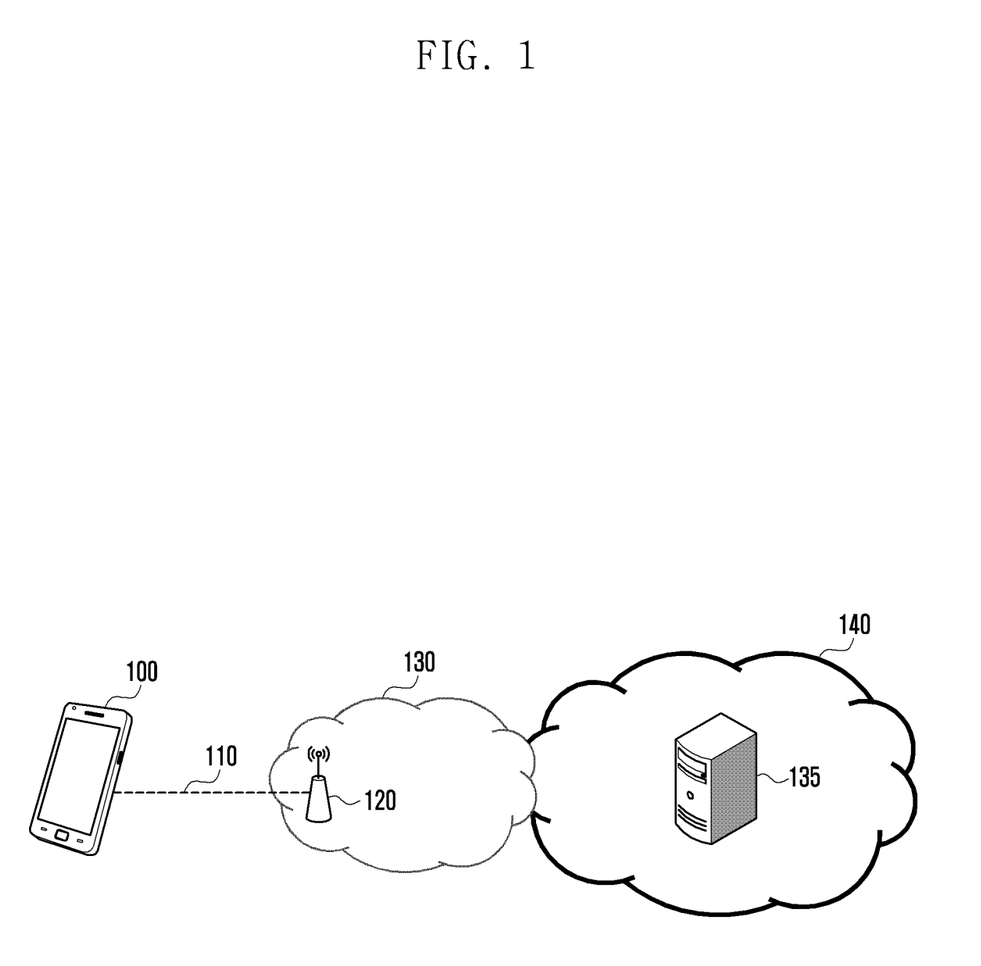
FIG. 1 is a diagram illustrating a normal wireless communication system.

FIG. 1 is a diagram illustrating a typical wireless communication system.

In reference to FIG. 1, the wireless communication system may include a terminal 100, a radio access network (RAN) 130, and a core network 140.

The RAN 130 is made up of a few components including the entity 120 interoperating with the terminal 100 through a radio interface 110, and other components of the wireless communication system are connected to each other through wired links. Examples of the component 120 of the RAN 130 that is interoperating with the terminal 100 through a radio interface 110 include an evolved Node B (eNB), a node B (NB) or a radio network system (RNS) including the NB, a base station transceiver station (BTS) and base station system (BSS) including the BTS, a wireless access point, a Home eNB, a home NB, a home eNB gateway (GW), and an X2 GW. In the following description, the term "radio access point" is used to refer to at least one of the aforementioned exemplary components 120 of the RAN 130 or the RAN itself.

Except for a few cases, it is typical for a radio access point 120 to host one or more cells, each cell having a predetermined range, and the terminal 100 is served within the range of the cell. Although the terms "cell" and "radio access point" denote a cell of a typical cellular system and a device for managing and controlling the cell, respectively, they may be interchangeably used with the same meaning for convenience of explanation in the following description. It may also be possible to interchangeably use the terms "cell" and "radio access point" for explaining an exemplary case (e.g., embodiment), if necessary.

Meanwhile, the core network 140 may include a RAN control entity 135. The RAN control entity 135 is responsible for an overall control function including mobility management and authentication and security. The RAN control entity 135 may include a mobility management entity (MME), a serving general packet radio service (GPRS) support node (SGSN), and a cell broadcast center (CBC).

The radio access point 120 has an appropriate coverage for providing a service to the terminal 100 through the radio interface 110.

Figure 2:
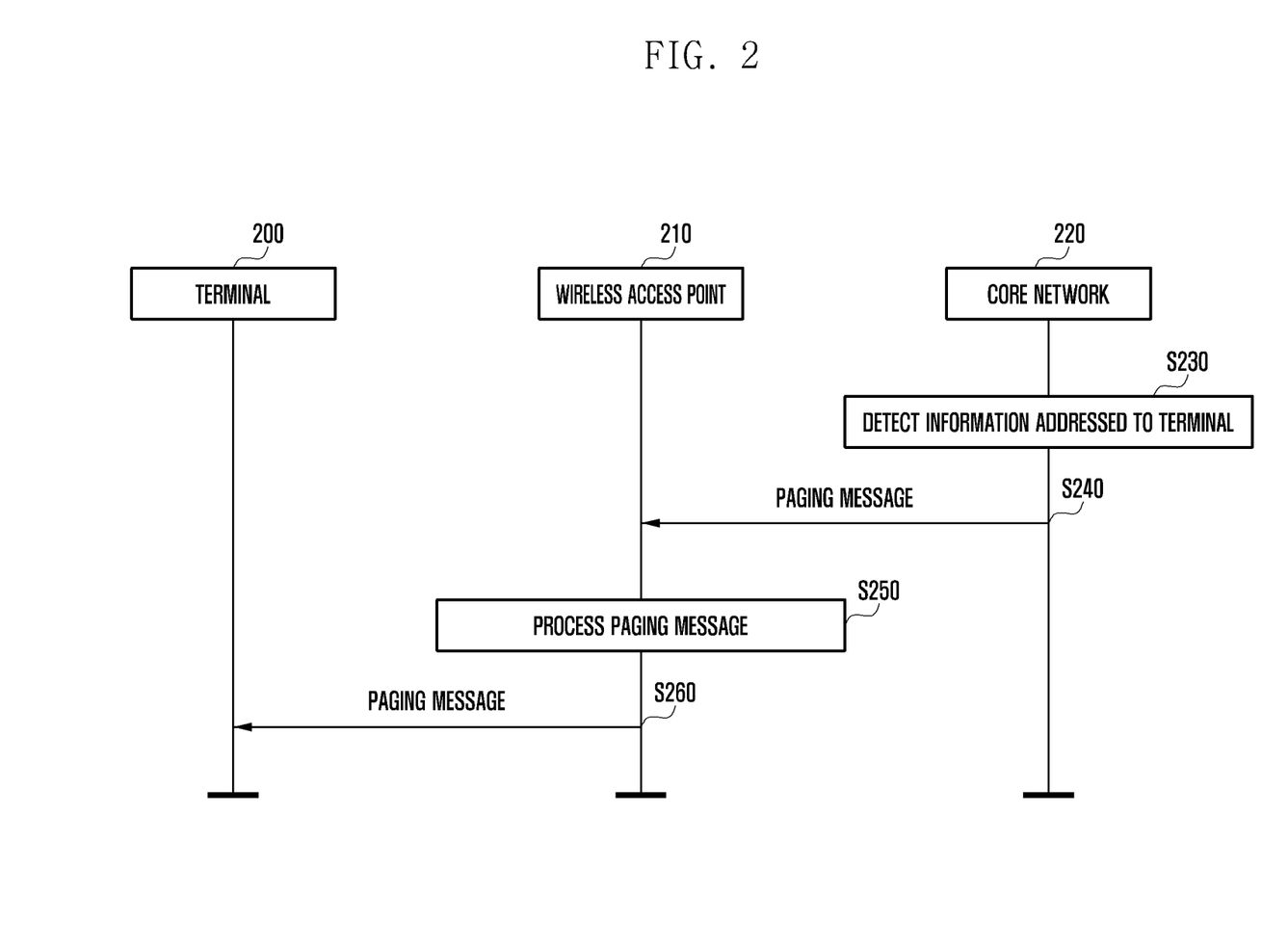
FIG. 2 is a diagram illustrating a paging procedure among a terminal, a radio access point, and a core network according to an embodiment of the present invention.

FIG. 2 is a diagram illustrating a paging procedure among a terminal, a radio access point, and a core network according to an embodiment of the present invention.

In the present invention, the wireless access point may correspond to the radio access point 120. The core network may include the RAN control entity 135.

The core network 220 may detect the presence of information to be transmitted to the terminal 200 at step S230. The MME and/or SGSN of the core network may receive a message indicative of the presence of the information addressed to the terminal 200 from a serving gateway (S-GW). The message may be one of a Create Bearer Request message, a Delete Bearer Request message, a Downlink Data Notification message, an Update Bearer Request message, a packet data network (PDN) gateway (P-GW) Restart Notification Message, and a Cancel Location message. The Downlink Data Notification message is used to notify the terminal 200 of the presence of user data information to transmit, while the other messages are used to notify the terminal 200 of the presence of control data information.

The core network 220 may determine to transmit data to the terminal 200 in other cases as well as when it detects the presence of information to be transmitted to the terminal 200 based on a message received from another entity. For example, in the case where the core network 220 or a home subscriber server (HSS) determines to detach the terminal 200 from the network, it may be necessary to transmit control data to request for detachment to the terminal 200.

Typically, the control data information and user data information may have different priorities, i.e., importance. For example, it may be necessary to transmit the control data information more urgently than the user data information to the terminal 200. It may also be possible to categorize the control data information and user data information in detail to assign a priority by category.

Descriptions are made hereinafter of the cases requiring transmission of control data information and the cases requiring transmission of user data information.

First, the control data information transmission is required in the cases as follows:

mobility management
  Detachment triggered by Detach Request message transmission (by core network 220)
  Detachment triggered by receipt of Cancel Location message or transmission of Detach Request message (by HSS)
session management
  Receipt of Create Bearer Request message or transmission of Activate Default (Dedicated) EPS Bearer Context Request message
  Receipt of Delete Bearer Request message/transmission of Deactivate EPS Bearer Context Request message
  Receipt of Update Bearer Request message/transmission of Modify EPS Bearer Context Request message
  network recovery (seems to be shown as a kind of session management)
  Receipt of P-GW Restart Notification message/transmission of Deactivate EPS Bearer Context Request message Second, the cases requiring transmission of user data information may be categorized by information element (IE) of Downlink Data Notification as follows:

EPS Bearer ID IE;
Allocation/Retention Priority IE; and
Paging and Service information IE According to the above categorization, the core network 220 may configure differently an S1: PAGING message to be transmitted to page the UE 200 in the idle mode. This is described in more detail at the next step S240.

At step S230, if the core network 220 detects the presence of information to be delivered to the terminal 200 that is in the idle mode, it may page the terminal 200 via the wireless access point 210. The core network 220 may send the wireless access point 210 a paging message (S1: PAGING message) at step S240. The S1: PAGING message may be configured as shown in Table 1.

TABLE 1

| IE/Group Name | Presence | Range | Comments |
| --- | --- | --- | --- |
| Message Type | M | | |
| UE Identity Index value | M | | BIT STRING (SIZE(10)) |

TABLE 1-continued

| IE/Group Name | Presence | Range | Comments |
|---|---|---|---|
| UE Paging Identity | M | | S-TMSI or IMSI |
| Paging DRX | O | | ENUMERATED (32, 64, 128, 256, . . . ) More values may be defined as the DRX period increases. |
| CN Domain | M | | ENUMERATED (PS, CS) |
| List of TAIs | | 1 | |
| >TAI List Item | | 1 . . . 256 | |
| >>TAI | M | | |
| CSG Id List | | 0 . . . 1 | |
| >CSG Id | | 1 . . . 256 | |
| Paging Priority | O | | Define priority level from 1 to 8. More values may be defined. |
| New IE for indicating importance of paging event | O | | |
| UE Radio Capability for Paging | O | | |
| Assistance Data for Paging | O | | It may include supplementary information on recommended cells, terminals supporting coverage enhancement (CE), and/or number of paging attempts. |

The Assistance Data for Paging IE may further include the information IEs as shown in Table 2.

TABLE 2

| IE/Group Name | Presence | Range | Comments |
|---|---|---|---|
| Assistance Data For Recommended Cells | O | | This may include information of Paging-related recommended cell identifiers (up to 16) and time period during which the terminal 200 has stayed in the corresponding cell. In the cell where the terminal 200 has not stayed, the stayed time period may not be included. |
| Assistance Data for CE capable UEs | O | | This is supplementary information for paging a terminal supporting CE. This may include the identifiers of the cells where the CE-supporting terminal has stayed and CE levels in the corresponding cells. |
| Paging Attempt Information | O | | This may include a number of paging attempts. This may further include a maximum number of paging attempts. |

At step S250, the wireless access point 210 may process the paging message for paging the terminal based on the paging message received from the core network 220. The wireless access point 210 may process the paging message in two mechanisms:
First mechanism: determine priorities of received paging messages
Second mechanism: determining paging areas of received paging messages Determining the priorities may include comparing the priority of the paging message that has been previously buffered in the paging buffer of the radio access point and the priority of a newly received paging message. The priority may indicate the importance of the paging message transmission to the terminal. In the present invention, the terms "priority" and "importance" may be used interchangeably. A detailed description thereof is made later. Afterward, the radio access point 210 may send the paging message to the terminal 200 based on the paging message processing result acquired at step S250. That is, the wireless access point 210 may send the paging message to the terminal based on the priorities and paging areas of paging messages buffered in the paging buffer.

Figure 3:
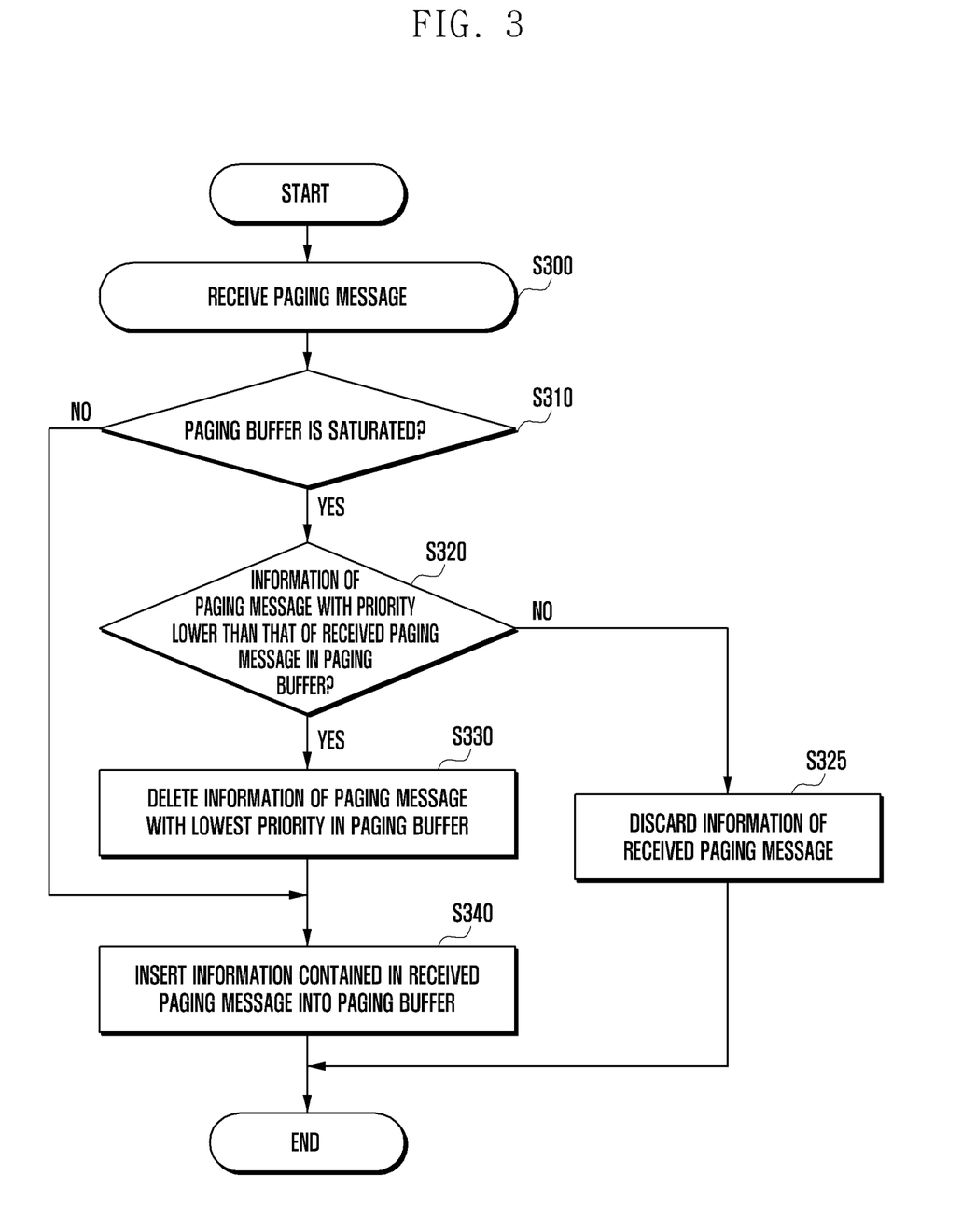
FIG. 3 is a flowchart illustrating a paging message priority determination procedure of a wireless access point according to an embodiment of the present invention.

FIG. 3 is a flowchart illustrating a paging message priority determination procedure of a wireless access point according to an embodiment of the present invention.

In more detail, the description is directed to the first mechanism for processing the paging message at step S250 of FIG. 2.

The wireless access point may receive a paging message from the core network at step S300. Next, the RAN may determine at step S310 whether the paging buffer is saturated. If it is determined that the paging buffer is saturated, the wireless access point may check at step S320 whether there is information on the paging message with a priority lower than that of the received paging message in the paging buffer. The paging buffer is a storage space for storing necessary information selected from the information included in the paging message when the wireless access point receives the paging message from the core network. The wireless access point compares the previously received paging message and the paging message received at step S300 to determine priorities thereof as follows.

In the present invention, the wireless access point may determine the priority of the paging message based on the information included in the received paging message. In particular, it may be possible to determine the priority of the paging message based on at least one of the priority of the information transmitted after paging the terminal using the paging message, number of paging attempts, and presence/absence of redundant paging.

First, the priority of the information being transmitted after paging the terminal with a paging message may be determined based on at least one of information elements included in the paging message as listed in Table 1, i.e., Paging Priority IE, new IE for indicating priority of a paging event, UE Radio Capability for Paging IE, and Assistance Data for CE capable UEs IE. The core network may indicate the importance of the information to be transmitted with at least one of the Paging Priority IE and the new IE for expressing the importance of the paging event. For example, the Paging Priority IE may be set to a value indicating one of the levels as follows.

Paging Priority IE value=PrioLevel1
Paging Priority IE value=PrioLevel2
Paging Priority IE value=PrioLevel3
Paging Priority IE value=PrioLevel4
Paging Priority IE value=PrioLevel5
Paging Priority IE value=PrioLevel6
Paging Priority IE value=PrioLevel7
Paging Priority IE value=PrioLevel8

The core network may configure at least one of the Paging Priority IE and the new IE for expressing an importance of a paging event to indicate whether the corresponding paging information is control data or user data. The core network 220 may use at least one of the Paging Priority IE and the new IE for expressing an importance of a paging event for detailed categorization as described at step S230 of FIG. 2. For example, the core network may use at least one of the Paging Priority IE and the new IE for expressing paging categorization to indicate control data for mobility management, control data for session management, user data for high priority level service, or user data for high level user.

In the case of receiving, at step S230, a message indicating the presence of information to be delivered to the terminal from a gateway, the core network may set the Paging Priority IE to an appropriate value based on the priority level of the Allocation/Retention Priority IE contained in the message. A wireless communication network operator may define a mapping relationship between the Priority Level of the Allocation/Retention Priority IE and the Paging Priority IE value, which is for persistent use in the wireless communication network. For example, it may be possible to pre-define a Priority Level of the Allocation/Retention Priority IE for voice over LTE (VoLTE) and map the Priority Level of the Allocation/Retention Priority IE to a specific Paging Priority IE value.

Services such as VoLTE and mission critical push to talk (MCPTT) that are identified by mapping the Priority Level of the Allocation/Retention Priority IE and a specific Paging Priority IE value may be subscribed by a person in charge of an emergency situation such as a government official or a police officer/firefighter.

Second, the information on the number of paging attempts may be acquired from the Paging Attempt Information IE included in the Assistance Data for Paging IE of the paging message as listed in Table 2. As the number of paging attempts by the core network 220 increases, the paging area of the core network 220 is expanded. Accordingly, the corresponding wireless access point may assign a low priority to the paging message with a large number of paging attempts. In the case where the Paging Attempt Information IE includes the information on the maximum number of paging attempts, the wireless access point may assign a low priority to the paging message as the number of paging attempts reaches the maximum number.

Third, the presence/absence of redundant paging may be determined based on at least one of the UE Paging Identity IE, internal timer of the wireless access point, and Paging Attempt Information IE included in the Assistance Data for Paging IE of the paging message as listed in Table 2. The internal time value may be determined in consideration of a timer value in use by the S-GW for detecting data redundant for the terminal. That is, the internal timer of the wireless access point may be set to a value identical with or similar to that of the timer of the S-GW. For reference, the S-GW may detect redundant data addressed to the terminal to determine whether to transmit a Downlink Data Notification message. The S-GW may determine whether to transmit the Downlink Data Notification message in further consideration of the paging priority.

The wireless access point may determine the receipt of a redundant paging message when a paging message received before a predetermined time includes the UE Paging Identity IE. It may also be possible to determine the receipt of a redundant paging message if the information on the paging message with the same UE Paging Identity IE is stored in the paging buffer of the wireless access point. It may also be possible to determine the receipt of a redundant paging message if a paging message with the number of paging attempts less than the value included in the Paging Attempt Information IE is received before a predetermined time. It may also be possible to determine the receipt of a redundant paging message if the information on the paging message with the number of paging attempts less than the value included in the Paging Attempt Information IE is stored in the paging buffer of the wireless access point.

The paging message may be categorized based on the three aforementioned factors, and a priority is assigned per category. As described above, the Paging Priority IE value of a paging message may fall into one of 8 priority levels and a case where no Paging Priority IE is included. As the level of the Paging Priority IE increases, the priority decreases; if no Paging Priority IE is included, the paging message may have the lowest priority.

In the case of considering whether the number of paging attempts, as the second factor, is greater or less than a predetermined threshold value and further considering the maximum number of paging attempts, the paging message may be categorized into one of the case where the number of paging attempts has reached the maximum number of paging attempts and the case where the Paging Attempt Information IE is not included. That is, the paging message may be categorized into one of the categories corresponding to the cases of all available combinations between the number of paging attempts and maximum number of paging attempts or the category that the paging message includes not Paging Attempt Information IE. The paging message has the highest priority for the case where the number of paging attempts is less than the threshold value and has not reached the maximum number of paging attempts and the lowest priority for the case where the number of paging attempts is greater than the threshold value and has reached the maximum number of paging attempts.

Finally, the paging message may be categorized based on presence/absence of paging message redundancy. The priority may be set to low for the presence of redundancy and high for the absence of redundancy. Although the description is directed to the case where the paging message is categorized based on the three factors, the present invention is not limited thereto and includes various embodiments.

Hereinafter, descriptions are made of several embodiments for a wireless access point to determine the priority of a received paging message based on a combination of the three factors.

First, the wireless access point may determine the priority of a paging message based on each of the three factors. For example, the wireless access point may determine the priority of the paging message based on the priority of the information received after paging the terminal using only the paging message without consideration of the number of paging attempts and presence/absence of redundant paging.

Next, the wireless access point may determine the priority of a paging message in a consideration order of the three factors. For example, it may be assumed to determine the priority of the paging message in a consideration order of the priority of the information transmitted after paging the terminal with the paging message, the number of paging attempts, and presence/absence of redundancy. The wireless access point may preferentially consider individual priorities of the paging information; if the individual priorities are identical with each other, the wireless access point may consider the individual priorities based on the number of paging attempts; if the individual priorities based on the number of paging attempts are identical with each other, the wireless access point may consider the individual priorities based on the presence/absence of redundancy.

Next, it may be possible to determine a priority of the paging message for paging the terminal in consideration of weights assigned to the three factors. That is, it may be possible to assign the same point to the same priority levels of the three factors on a maximum scale and determine the priority of the paging message based on the total points of the three factors in consideration of the weight. For example, it is assumed that the weights for the priority of the paging information, number of paging attempts, and presence/absence of redundancy are predetermined as 50%, 30%, and 20%, respectively. In this case, it may be possible to assign a point to the three factors on a maximum scale of 10 points and determine that the paging message with the total points obtained by multiplying the assigned points by the weights and summing the multiplication results has a high priority for paging the terminal.

Hereinafter, a description is made of the case of receiving one or more new paging message while a wireless access point determines the priorities of the paging messages. The wireless access point may establish another buffer for storing the information on the new paging messages. This buffer established for storing the information on the new paging messages may be referred to as a paging buffer. The temporary buffer is a buffer for storing temporarily the paging messages of which priorities have not been determined yet. The wireless access point may store the paging messages in the order of receipt. The wireless access point may determine the priorities of the paging messages accumulated in the paging buffer in sequence.

At step S325, the wireless access point may determine the priorities of the paging messages through the above-described operations and, if there is no paging message with a priority lower than that of the received paging message in the paging buffer, discard the information on the paging message received at step S240 of FIG. 2.

Otherwise, if there is a paging message with a priority lower than that of the received paging message in the paging buffer of the wireless access point, the wireless access point may delete, at step S330, the information on the paging message with the lowest priority in the paging buffer. Also, if the paging resources in the wireless access point are congested, the wireless access point may delete the information on the paging message with the lowest priority in the paging buffer. If there are multiple paging messages with priorities lower than that of the received paging message, the wireless access point may delete the information on the paging message with the lowest priority. Next, the wireless access point may insert the information contained in the received paging message into the paging buffer at step S340. Next, the wireless access point may page, at step S350, the terminal according to the information of the paging message. The wireless access point may send the paging message to the terminal based on the priority of the paging message buffered in the paging buffer.

Alternatively, the wireless access point may align the paging information in advance in the paging buffer based on the determined priorities. In this case, the wireless access point may determine the paging message to be discarded based on a comparison between the priorities of the paging message with the lowest priority and the newly-received paging message according to the aligned order.

If it is determined at step S310 that the paging buffer is not saturated, the wireless access point may insert the information contained in the received paging message into the paging buffer at step S340. The wireless access point may insert the information contained in the paging message into the paging buffer when the paging resources of the paging buffer are not congested. Afterward, the wireless access point may send the paging message to the terminal. In this case, the wireless access point may send the terminal the paging message stored in the buffer based on the priority of the paging message. The wireless access point may also change the order of the paging messages in the paging buffer of the wireless access point.

A description is made of the second mechanism for processing the paging message at step S250 of FIG. 2. That is, how to determine the paging area of the paging message received by the wireless access point is described. In the case of paging the terminal based on the information of the paging message buffered in the paging buffer, the wireless access point may determine a paging area based on the number of paging attempts. The wireless access point may extend the paging area of the wireless access point as the number of paging attempts increases. The paging area may be determined based on the cell of the wireless access point. For example, as the number of paging attempts decreases, the wireless access point may determine a small paging area. That is, as the number of paging attempts decreases, the wireless access point may page the terminal in at least one cell indicated by at least one recommended cell identifier or only in at least one cell indicating at least one cell identifier with a high priority among the recommended cell identifiers. As the number of paging attempts increases, the wireless access point may extend the cell area and, if the number of paging attempts is greater than a threshold value, page the terminal in all of the cells of the wireless access point. However, if there is no redundant paging event yet in the paging buffer, the wireless access point may determine a paging area larger than the paging area of the paging event in the paging buffer.

The wireless access point may also manage the paging buffer per cell. The wireless access point may manage the per-cell paging buffers based on the operation of determining the priorities of the paging messages. In the case where the number of paging attempts of the paging message is high, the wireless access point that has received the paging message from the core network may exclude from the paging area the paging cell of which the paging buffer has been saturated or of which resources are congested.

Figure 4:
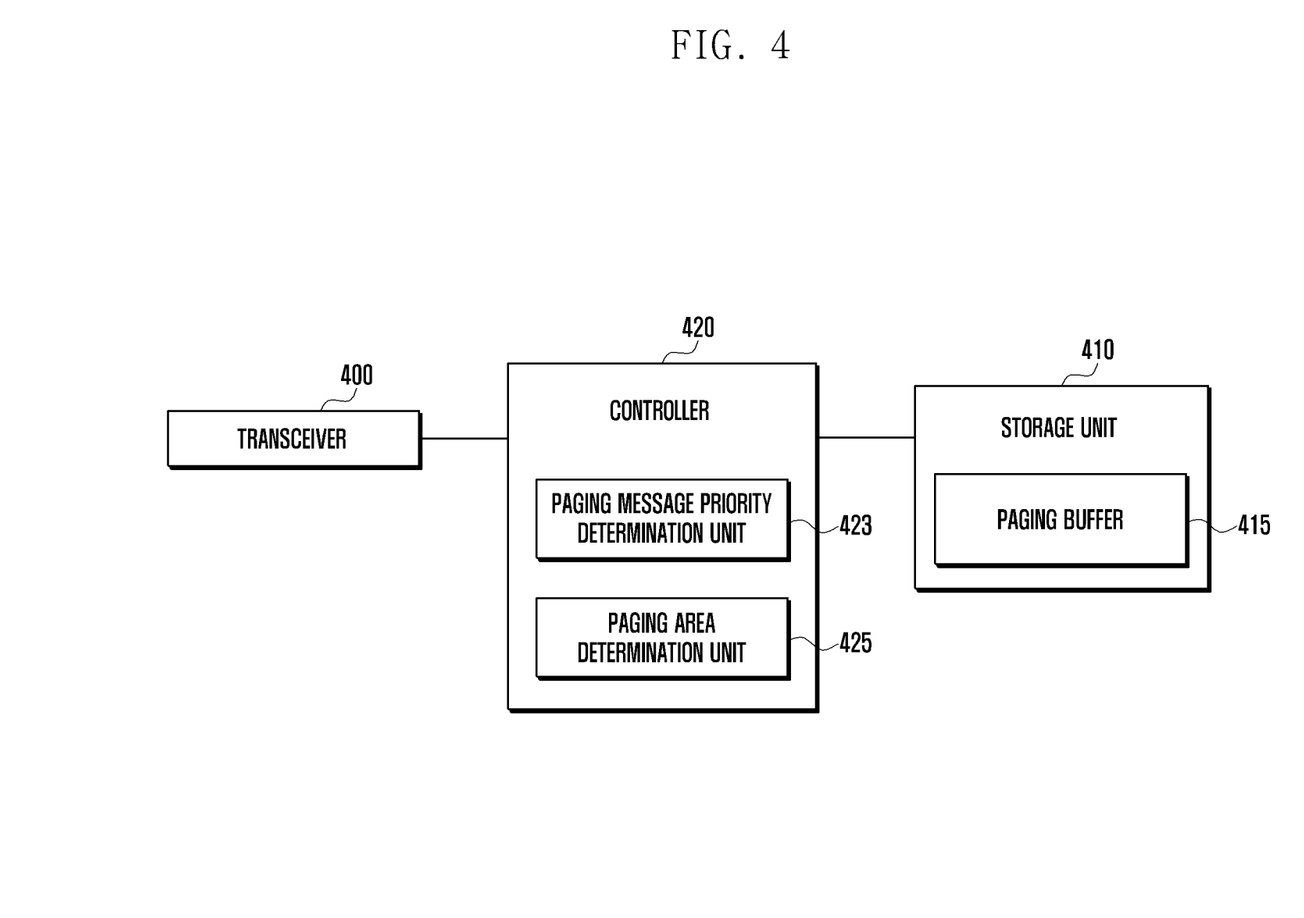
FIG. 4 is a block diagram illustrating a configuration of a wireless access point according to an embodiment of the present invention.

FIG. 4 is a block diagram illustrating a configuration of a wireless access point according to an embodiment of the present invention.

In reference to FIG. 4, the wireless access point may include a transceiver 400, a storage unit 410, and a controller 420. The storage unit 410 may include a paging buffer 415, and the controller 420 may include a paging message priority determination unit 423 and a paging area determination unit 425.

The transceiver 400 may transmit and receive signals related to operations of the wireless access point according to the present invention. In detail, the transceiver 400 may receive a paging message from the core network. The transceiver 400 may also process the paging message and transmit the paging message based on the processing result.

The storage unit 410 may store the information for use in the operations of the wireless access point according to the present invention. The storage unit 410 may store the information carried in the paging message received from the core network. In detail, the paging buffer 415 of the storage unit 410 may store the information carried in the paging message. The storage unit 410 may provide the controller 420 with the stored information.

The controller 420 may control the operation of the wireless access point according to the present invention. The paging message priority determination unit 423 of the controller 420 may determine the priorities of the paging messages received by the transceiver 400. The paging area determination unit 425 of the controller 420 may also determine the area for delivering the paging message to the terminal. The controller 420 may take charge of the operations of the paging message priority determination unit 423 and the paging area determination unit 425.

In detail, the controller 420 may control to receive a plurality of paging messages from the core network, determine the priorities of the paging messages, and transmit the paging messages to the terminal based on the determined priorities. The controller 420 may also determine whether the paging buffer has been saturated and, if so, control to determine the priority among at least one first paging message that has been previously stored in the paging buffer and a newly received second paging message.

If it is determined that the first paging message has a priority lower than that of the second paging message, the controller 420 may control to discard the information of the first paging message in the paging buffer and store the information of the second paging message in the paging buffer. The controller 420 may also determine the paging order of the paging messages based on the determined priorities and control to transmit the paging messages based on the determined paging order. The controller 420 may also determine a paging area for delivering the paging message to the terminal based on at least one of the number of paging attempts and presence/absence of redundancy and control to transmit the paging message to the terminal based on the determined paging area.

If a third paging message is newly received in the course of determining the priorities, the controller 420 may control to store the information on the third paging message in a temporary buffer different from the paging buffer, select the paging message with a relatively low paging priority among the first and second paging messages, and determine the priority between the selected paging message and the second paging message.

In the above-described embodiments of the present invention, the steps and message transmissions may become the targets of being selectively carried out or omitted. In each embodiment of the present invention, it is not necessary for the operations to be performed in the sequential order as depicted, and they may be performed in a changed order. Each step and message transmission may be performed independently.

Some or all of the tables exemplified in the above-description are provided to help understand the present invention. Accordingly, the detailed description of the table is to express part of the method and apparatus proposed in the present invention. That is, it is preferable to approach the content of the table of the specification semantically rather than syntactically.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A base station for paging in a mobile communication system, the base station comprising:
   a transceiver; and
   a controller coupled with the transceiver and configured to control to:
      receive, from a core network entity, a plurality of paging messages including information on a number of paging attempts,
      determine priorities of the plurality of paging messages based on the information on the number of paging attempts, and
      transmit, to a terminal, a paging message among the plurality of paging messages based on the determined priorities.

2. The base station of claim 1, wherein the controller is configured to:
   determine whether a paging buffer is saturated with information for previously received paging messages, and
   determine, when the paging buffer is saturated with the information for previously received paging messages, priorities of at least one first paging message previously stored in the paging buffer and a received second paging message.

3. The base station of claim 2, wherein the controller is configured to:
   store, when a third paging message is newly received during the priority determination, information of the third paging message in a temporary buffer different from the paging buffer,
   select the paging message with a low priority between the first and second paging messages, and
   determine the priority between the selected paging message and the third paging message.

4. The base station of claim 1, wherein the controller is configured to:
   discard, when a first paging message has a priority lower than a priority of a second paging message, information of the first paging message in a paging buffer, and
   store the information of the second paging message in the paging buffer.

5. The base station of claim 1, wherein the priorities of the paging messages are determined based on at least one of a priority of information being carried in the paging message, a number of paging attempts, and presence/absence of redundancy of the paging message.

6. The base station of claim 5, wherein the priorities of the paging messages are determined based on values obtained by applying predetermined weights to the priority of information being carried in the paging message, the number of paging attempts, and the presence/absence of redundancy of the paging message.

7. The base station of claim 1, wherein the controller is configured to:
   determine a paging order of the paging messages based on the determined priorities, and
   transmit the paging messages based on the determined paging order.

8. The base station of claim 1, wherein the controller is configured to:
   determine a paging area for the paging messages based on at least one of a number of paging attempts and presence/absence of redundancy that are included in the paging messages, and
   transmit the paging messages to the terminal based on the determined paging area.

9. The base station of claim 8, wherein the paging area comprises a cell area of a wireless access point.

10. A paging method by a base station in a mobile communication system, the method comprising:
    receiving, from a core network entity, a plurality of paging messages including information on a number of paging attempts;
    determining priorities of the plurality of paging messages based on the information on the number of paging attempts; and
    transmitting, to a terminal, a paging message among the plurality of paging messages based on the determined priorities.

11. The method of claim 10, wherein determining the priorities of the paging messages further comprises:
    determining whether a paging buffer is saturated with information for previously received paging messages; and
    determining, when the paging buffer is saturated with the information for previously received paging messages, priorities of at least one first paging message previously stored in the paging buffer and a received second paging message.

12. The method of claim 10, further comprising:
    discarding, when a first paging message has a priority lower than a priority of a second paging message, information of the first paging message in a paging buffer; and
    storing the information of the second paging message in the paging buffer.

13. The method of claim 10, wherein the priorities of the paging messages are determined based on at least one of a priority of information being carried in the paging message, a number of paging attempts, and presence/absence of redundancy of the paging message or based on values obtained by applying predetermined weights to the priority of information being carried in the paging message, the number of paging attempts, and the presence/absence of redundancy of the paging message.

14. The method of claim 10, wherein transmitting the paging messages to the terminal based on the determined priorities comprises:
    determining a paging order of the paging messages based on the determined priorities;
    transmitting the paging messages based on the determined paging order;
    determining a paging area the paging messages based on at least one of a number of paging attempts and presence/absence of redundancy that are included in the paging message; and
    transmitting the paging message to the terminal based on the determined paging area.

* * * * *